United States Patent [19]

Umemoto et al.

[11] Patent Number: 4,501,863

[45] Date of Patent: Feb. 26, 1985

[54] POLYCARBOXYLIC ACID RESINOUS COMPOSITION, ITS PREPARATION AND COATING COMPOSITION CONTAINING THE SAME

[75] Inventors: Hirotoshi Umemoto; Hisaki Tanabe, both of Kyoto; Mitsuo Yamada; Shinji Nakano, both of Osaka, all of Japan

[73] Assignee: Nippon Paint Co., Ltd., Japan

[21] Appl. No.: 567,313

[22] Filed: Dec. 30, 1983

[30] Foreign Application Priority Data

Dec. 30, 1982 [JP] Japan ............................... 57-232900

[51] Int. Cl.³ .................... C08F 283/00; C08G 63/76; C08L 61/00
[52] U.S. Cl. .................................... 525/443; 525/441; 528/302
[58] Field of Search ................. 525/441, 443; 528/302

[56] References Cited

U.S. PATENT DOCUMENTS

| | | | |
|---|---|---|---|
| 3,862,072 | 1/1975 | Sekmakas | 525/443 X |
| 3,994,851 | 11/1976 | Chang | 525/443 X |
| 4,049,599 | 9/1977 | Lott | 525/443 |
| 4,088,619 | 5/1978 | Holzrichter | 525/443 X |
| 4,140,729 | 2/1979 | Tobias et al. | 525/443 X |
| 4,229,555 | 10/1980 | Tobias et al. | 525/443 |

*Primary Examiner*—Lucille M. Phynes
*Attorney, Agent, or Firm*—Wenderoth, Lind & Ponack

[57] ABSTRACT

A resinous composition for coating use comprising a resin having a resinous acid value derived from polycarboxylic acid whose titration midpoint potential in non-aqueous potentiometric titration is more than −300 mV under the state capable of developing resinous acid value of 2 to 50 and having a functional group reactive with a crosslinking agent, and preparation thereof.

The composition is useful for the preparation of coating composition having improved curing property.

4 Claims, 1 Drawing Figure

POLYCARBOXYLIC ACID RESINOUS COMPOSITION, ITS PREPARATION AND COATING COMPOSITION CONTAINING THE SAME

FIELD OF INVENTION

The present invention relates to a coating composition having improved curing property. The invention also concerns a resinous composition to be used for the abovesaid coating composition and preparation thereof.

BACKGROUND OF THE INVENTION

Since an aminoplast obtained by the reaction of a compound having amino group, acid amide bonding or the like, and formaldehyde, as, for example, melamine resin, urea resin, aniline-formaldehyde resin and the like, has such active group as active hydrogen, active methylol and active alkoxymethylene, it is generally combined with various resins for coating use having a functional group which is reactive with the abovesaid active group, as hydroxyl group, isocyanate group or the like, including acrylic resin, alkyd resin, polyester resin, epoxy resin, polyurethane resin, polyamide resin, polycarbonate resin and the like, and used as heat curing type coating composition.

Various isocyanate compounds are also used, with said base resins, in heat curing type coating compositions. However, such coating compositions generally require high temperature baking, and in the combination of said resins and aminoplasts, are practiced the baking at about 140° C. for the combination of alkyd resin and melamine resin for automobile use and the baking at about 170° C. and more for the combination of epoxy resin and amino resin for coil coating use.

From the stanview of energy saving, it is, of course, desired to have a lower baking temperature and for this end various proposals have been made. One of the proposals heretofore made is to increase an acid value and hydroxyl number of such resin as alkyd resin, thereby improving the reactivity with aminoplast, and to increase the molecular weight of the resin, thereby improving the curing property thereof. However, this inevitably accompanys with such problems as undesired increase in paint viscosity, lowering of storage stability and decrease in water resistance of the formed film. Attempts have also been made to increase the molecular weight of aminoplast and improve the curing property of the coating composition but the results have been proved to be null because of causing additional problem of poor compatibility with alkyd and other resins.

There is another proposal of adding an external catalyst as p-toluene sulfonic acid, phosphoric acid and the like to the combination of coating use resin and crosslinking agent. However, no satisfactory results are obtained because of the poor pigment dispersion stability, e.g. segregation, due to the presence of external acid catalyst, poor storage stability due to the gradual curing of the coating composition at room temperature and lowering of water resistance of the film. In case that the isocyanate compounds are used as crosslinking agents, employment of external catalyst as tin compound, amino compound and the like, will cause decrease in pot-life of the coating composition, resulting the inferior working properties thereof.

From the foregoing, the inventors, having made endeavor for obtaining a coating composition which comprises a coating use resin and crosslinking agent, has an improved curing property without the necessity of using an external catalyst, is curable at a lower temperature or in a shorter period of time, and is excellent in storage stability, capable of resulting excellent film performance, have completed the invention.

SUMMARY OF THE INVENTION

According to the present invention, is provided a coating composition with improved curing property which comprises at least one resin whose acid value based on a polycarboxylic acid capable of showing a titration midpoint potential of more than $-300$ mV in a non-aqueous potentiometric titration under the state of developing the resinous acid value, is 2 to 50 and which bears functional group being reactive with a crosslinking agent, and at least one crosslinking agent, the weight ratio of said resin to said crosslinking agent being, on solid basis, 95/5 to 45/55.

The said resin having a resinous acid value based on a polycarboxylic acid capable of showing a titration midpoint potential of more than $-300$ mV in a non-aqueous potentiometric titration under the state of developing the resinous acid value is 2 to 50 and which bears functional group being reactive with a crosslinking agent is a novel curable resin in that it contains a particular amount of acid with a specific acidity.

Such resin may be successfully and advantageously prepared by the present method comprising effecting an esterification with (A) Wa parts by weight (on solid basis) of a resin having both functional group being reactive with carboxyl group and functional group being reactive with a crosslinking agent, and (B) Wb parts by weight of polycarboxylic acid capable of showing a titration midpoint potential of more than $-300$ mV in a non-aqueous potentiometric titration under the state of developing resinous acid value, to a resinous acid value $N+M$, wherein Wb is a value calculated from the following:

$$Wb = \frac{N \cdot Wa}{\frac{56100}{E}\left(1 - \frac{P}{100}\right) - N}$$

E is a gram equivalent of polycarboxylic acid (B), P is the reaction % of the poycarboxylic acid (B) to be reacted with resin (A), N is the resinous acid value in the final resin based on the polycarboxylic acid (B) and is determined in a range of 2 to 50, and M is the resinous acid value originally possessed by the resin (A) and is 0 or any positive integer.

The invention, therefore, includes both resinous composition for coating use and preparation thereof.

In the present specification and claims, the term "crosslinking agent" denotes "aminoplast and isocyanate compound", the term "functional group reactive with a crosslinking agent" means "functional group which is reactive with active hydrogen, active methylol or active alkoxymethylene possessed by aminoplast or functional group which is reactive with isocyanate possessed by isocyanate compound". The term "functional group reactive with carboxyl group" means "any functional group which is reactive with carboxyl group, including hydroxyl, acid amide bonding and the like". Also, the term "non-aqueous potentiometric titration" means "potentiometric titration wherein the test resin is dissolved in non-aqueous solvent and n-tetrabutylammonium hydroxide is used as titration reagent".

When a polycarboxylic acid is reacted with a resin having functional group reactive with carboxyl group, as, for example, hydroxyl, acid amide bonding or the like (hydroxyl can be the functional group reactive with carboxyl group and at the same time, the functional group reactive with a crosslinking agent), said acid may be incorporated by, for example, ester bonding, acid amide bonding or the like into the resin, thereby resulting the resin in which a part of carboxyl groups of said polycarboxylic acid are maintained in the polymer chain in the state capable of developing resinous acid value.

The inventors have found that irrespective of adding no external catalyst as a curing promoter to the coating composition comprising a crosslinking agent and a resin having a functional group reactive with said crosslinking agent, the so-called internal catalyst function may be successfully be given to the coating composition by the inclusion of acid component into the resin in the state capable of developing resinous acid value. The inventors then, having studied the acidity and the amount of acid to be incorporated into said resin, have completed the invention. Thus, the invention provides a coating composition having internal catalyst function, which is characterized by that in the combination of resinous composition and crosslinking agent, use is made of particular resin having incorporated therein an acid with specific acidity in a specified amount in the state capable of developing a resinous acid value. The present resin having this particular carboxyl group, as well as the functional group which is reactive with crosslinking agent, may be, as already stated, any of the resins selected from alkyd, polyester, acrylic, epoxy, polyurethane, polyamide, polycarbonate resins and the like, curable with aminoplast or isocyanate compound. The heat curing may be of any type of the following: reaction between hydroxyl and active methylol groups; reaction between hydroxyl and active alkoxymethylene groups; reaction between an active hydrogen bearing group as hydroxyl, carboxyl, amino or imino group, and isocyanate group and the like. Various other reactions have also been known. However, since they cannot constitute the characteristic feature of this invention and are well known in the art, the details are omitted herein.

For the sake of briefness, the invention shall be now explained with the combination of resin having both carboxyl and hydroxyl groups (the latter may also be the functional group reactive with crosslinking agent) and aminoplast (cross-linking agent).

Since hydroxyl group has such dual functions, when the hydroxyl bearing resin is reacted with a polycarboxylic acid, e.g. di-, tri- or tetra-carboxylic acid, or its anhydride, at least one of the carboxyl groups of said polycarboxylic acid may be reacted and used in the esterification, thereby taken into the polymer, and the remaining carboxyl group having not participated in said reaction may be left in the polymer in the sate capable of developing resinous acid value. The hydroxyl groups not reacted with said polycarboxylic acid may also be in the resulted resin. At this time, the resinous acid value based on said particular carboxyl may be freely controlled by the regulation of amount of said polycarboxylic acid to be used and reaction % thereof.

It has been known in the art that when a potential-TBAH (tetrabutyl ammonium hydroxide) titer curve of a polycarboxylic acid is made from the results of its non-aqueous potentiometric titration, there shows a plural number of inflection points depending on the type of the acid used. However, at the state when the acid is incorporated into a resin by ester bonding, since there remains, as already stated, at least one free carboxyl group, the said inflection points will naturally loose in number, accordingly.

In this invention, the polycarboxylic acid to be used and incorporated into a resin must be of such acidity that the titration midpoint potential in non-aqueous potentiometric titration is more than $-300$ mV, under the state of being incorporated into the resin, i.e. at the state of developing resinous acid value. The inventors have found the very important fact that with a polycarboxylic acid whose titration midpoint potential is less than $-300$ mV, the present object of curing promotion cannot be attained, and on the basis of this finding, have completed the invention. Selection of appropriate polycarboxylic acid is rather easy by the adoption of simple test wherein the test acid is reacted with hydroxy bearing resin and titration midpoint potential is measured according to a normal procedure.

The polycarboxylic acids advantageously used in the present invention may include phthalic anhydride, pyromellitic acid, pyromellitic anhydride, trimellitic acid, trimellitic anhydride, tetrachlorophthalic anhydride, tetrachloro phthalic acid, tetrabromophthalic anhydride, tetrabromophthalic acid, HET acid, HET anhydride and the like.

It is essential that the abovesaid polycarboxylic acid be incorporated in a resin so as to give the resinous acid value from said acid of 2 to 50. This is because at the level of less than 2, the present object of curing promotion cannot be attained, whereas at the level of more than 50, there is a trend that minimum film thickness causing no pinholes will get increased and there result inferior storage stability of the coating composition and decreased water resistance of the formed film.

The present resin may be advantageously prepared by the the following method: That is, Wa parts by weight (on solid basis) of hydroxy bearing resin (hydroxy has dual functions as the group reactive with carboxyl group and as the group reactive with crosslinking agent), are reacted with Wb parts by weight of the polycarboxylic acid showing a titration midpoint potential of more than $-300$ mV in non-aqueous potentiometric titration at the state capable of developing resinous acid value, to a resinous acid value of $N+M$, wherein Wb is determined by the following equation $$Wb = \frac{N \cdot Wa}{\frac{56100}{E}\left(1 - \frac{P}{100}\right) - N}$$

in which E represents 1 gram equivalent of said polycarboxylic acid; P is the reaction % of said polycarboxylic acid to be reacted with hydroxy bearing resin; N is resinous acid value based on said polycarboxylic acid in the final resin and is determined in a range of 2-50; and M represents the resinous acid value originally possessed by the hydroxy bearing resin and is 0 or any positive integer.

By determining the amount of polycarboxylic acid used with the abovesaid equation and controlling the reaction by measuring the resinous acid value, a specified amount of acid with specific acidity can be incorporated into the resin so as to develop the defined resinous acid value. The invention may include cold blend of more than two resins, providing that the resinous acid value from the abovementioned polycarboxylic acid is within the limit of 2 to 50 regardless of the acid content of the respective resins.

Thus obtained resin is, in the combination of aminoplast, stable at normal temperatures, and can exhibit effectively the internal catalyst function when heated, thereby showing improved and accelerated curing. Thus, the curing may be carried out at a lower temperature or in a shorter period of time as compared with those of heretofore known similar compositions. Moreover, the resulted film is excellent in many respects and can be comprable with those of the known similar compositions.

For example, in the combination of melamine resin as aminoplast and alkyd resin, the composition is usually baked and hardened, as practiced in an automobile industry, at 140° C. for about 30 minutes. However, by the adoption of the present invention, it is possible to carry out the same extent of baking at 70° to 110° C. or even less temperature, to obtain the similar product. No change in the film performance can be found out.

In case that melamine resin is used as aminoplast, it should preferably be compatible with the present resin. In this regard, particular preference is given to the melamine resin having more than 2.0 alkoxy groups per molecule. There is no particular limit in the number average molecular weight and it may be in a conventional range of 500 to 3,000 or the like.

Even in the combination with hexamethoxymethylol melamine, it is possible to attain a lower temperature curing and to provide a high solid coating composition.

In the present invention, the abovesaid resin having a resinous acid value based on the polycarboxylic acid whose titration midpoint potential in non-aqueous potentiometric titration, under the state capable of developing resinous acid value, is more than $-300$ mV, of 2 to 50 and having a functional group capable of reacting with a crosslinking agent, is used together with the crosslinking agent in a weight ratio (on solid basis) of 95/5 to 45/55.

Such composition may be used as clear coating as it is or may be added with pigment and other additives and used as colored paint.

At the time when isocyanate compound is selected as a crosslinking agent and external catalyst is added to a coating composition, troubles have been always encountered in the pot-life of the composition.

However, with the present resinous composition, it is possible to obtain, without the necessity of adding an external catalyst, a coating composition which is capable of resulting an excellent coating and shows an improved pot-life. Thus, in the present invention, is provided a resinous composition being useful as resinous vehicle for coating composition, which is characterized by excellent curing property, storage stability and film performance, without the necessity of adding an external catalyst as in the conventional ones. Therefore, the invention is quite important from the standview of saving natural resources.

This invention shall be now more fully explained in the following Examples.

EXAMPLE 1

Preparation of resinous composition of polyester resin whose acid value based on phthalic anhydride is 6.0, by the esterification of (A) 249.2 parts by weight (in solid) of polyester resin A-1 having, as acid components, isophthalic acid and adipic acid and having a resinous acid value of 2.0, and (B) Wb parts by weight of phthalic anhydride which gives, under the state of developing resinous acid value, a titration midpoint potential of $-290$ mV in a non-aqueous potentiometric titration, to a resinous acid value of 8.0

| Composition of polyester resin A-1 | | |
| --- | --- | --- |
| isophthalic acid | 127.31 parts | (0.766 mole) |
| adipic acid | 29.24 | (0.2) |
| trimethylolpropane | 29.05 | |
| neopentylglycol | 52.77 | |
| 1,6-hexanediol | 56.04 | |
| Resin weight (Wa) | 249.2 parts | |
| Calculation of Wb of phthalic anhydride: | | |
| resin weight of polyester A-1 | Wa = 249.2 | |
| resinous acid value based on phthalic anhydride | N = 6.0 | |
| 1 gram equivalent of phthalic anhydride | E = 74.1 | |
| reaction % of phthalic anhydride to be reacted with polyester A-1 | P = 60.0 | |
| From the abovesaid equation: Wb = 5.04 (0.034 mole) | | |

Into a reaction vessel fitted with heating device, stirrer, refluxing device, water separator, fractionator and thermometer, were placed the abovesaid 5 starting materials for polyester resin A-1 and the mixture was heated. Stirring was commenced at the stage when they were melted to a stirrable condition, and the vessel temperature was raised to 220° C. At this time, from 160° to 220° C., said temperature was raised in 3 hours at a constant rate. The formed condensed water was continuously removed out of the system. When reached to 220° C., the reaction vessel was maintained at the same temperature for 1 hour and then gradually added with 5 parts of xylene as a refluxing solvent. The reaction was then switched to a condensation in the presence of solvent and continued for a while. At the stage when the resinous acid value reached to 2.0, the reaction was overed and the content was allowed to cool to 100° C. to obtain polyester resin A-1.

Next, 5.04 parts (0.034 mole) of phthalic anhydride were placed in said reaction vessel, temperature was raised to 160° C. and the reaction was continued. When the resinous acid value reached to 8.0, the reaction was stopped and the content was allowed to cool. Thereafter, 118.2 parts of xylene and 13.7 parts of Cellosolve acetate were added to obtain polyester resin varnish L. This varnish showed non-volatile content 69.8%, viscosity (Gardner viscosity, 25° C.) U-V, and resinous acid value 8.2.

Figure 1:
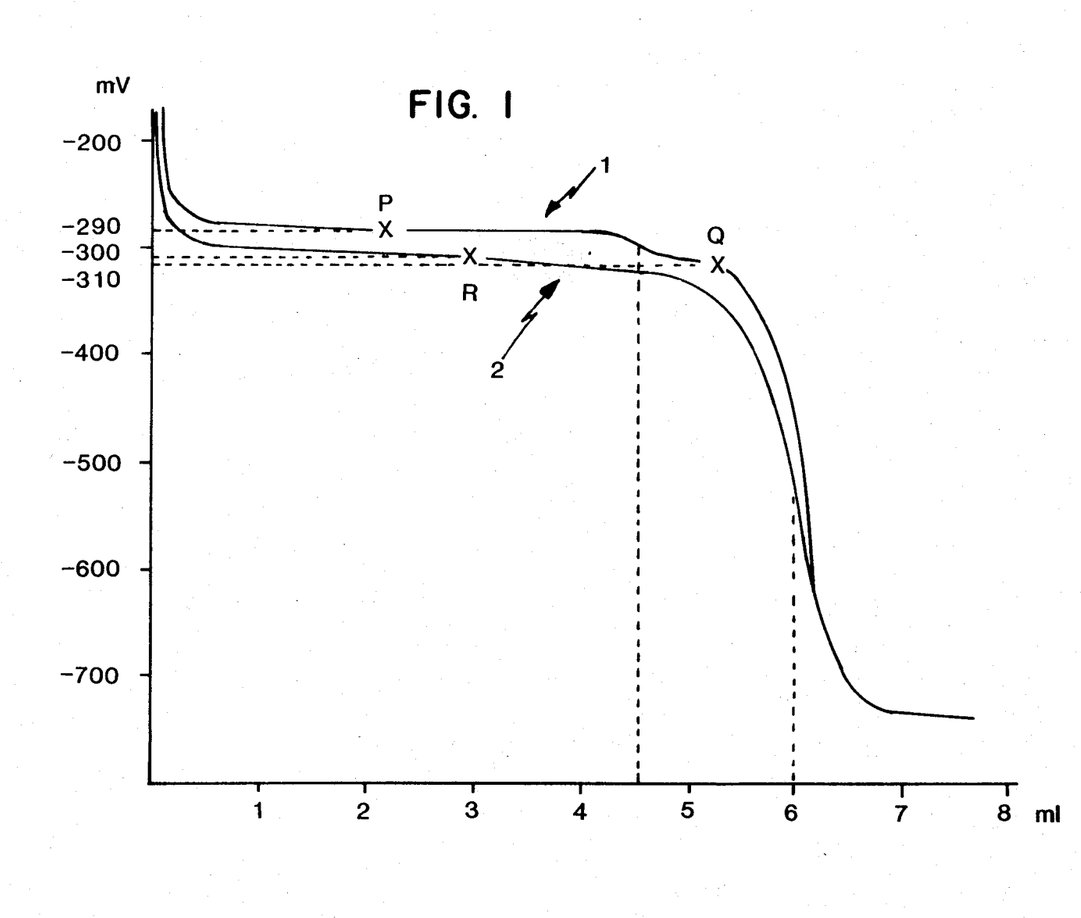

Each of the polyester resin A-1 and the resin varnish L were dissolved in pyridine, and subjected to a non-aqueous potentiometric titration using, as a titration reagent, n-tetrabutylammonium hydroxide. The titration curves are shown in FIG. 1. As is clear from the drawing, titration midpoint (R) potential of polyester resin A-1 (curve 2) is $-310$ mV, which coincides with the titration midpoint potential of polyester resin having as acid component, isophthalic acid alone (see Table 1). From this, it was confirmed that the carboxyl groups in polyester resin A-1 showing a resinous acid value of 2.0 were all derived from isophthalic acid. However, in the titration curve (1) of polyester resin L, there are two inflection points and the titration midpoint (P,Q) potentials are −290 mV and −310 mV, which are well in accord with the titration midpoint potentials (−290 mV and −310 mV) of polyester resins having as acid component, phthalic anhydride and isophthalic acid alone, respectively. (see Table 1). Therefore, it was confirmed that the carboxyl groups of polyester resin L capable of developing resinous acid value were derived from both phthalic anhydride and isophthalic acid and that the resinous acid value coming from phthalic anhydride was 6.1, as so planned.

TABLE 1

Titration midpoint potentials of various carboxylic acids under the state of developing resinous acid value HHPA = hexhydrophthalic anhydride
AdA = adipic acid
IPHA = isophthalic acid
PAn = phthalic anhydride
TMAn = trimellitic anhydride

|  | potential (mV) |  | potential (mV) |
| --- | --- | --- | --- |
| HHPA | −400 | PAn | −290 |
| AdA | −390 | IPHA | −310 |
| sebacic acid | −420 | TMAn | −240 |

EXAMPLE 2

| Composition of polyester resin A-2 | | |
| --- | --- | --- |
| isophthalic acid | 97.23 parts | (0.585 mole) |
| adipic acid | 29.24 | (0.2) |
| trimethylolpropane | 42.96 | |
| neopentylglycol | 36.99 | |
| 1,6-hexanediol | 39.28 | |
| resin weight (Wa) | 213.0 parts | |
| resinous acid value | 2.0 | |
| Calculation of Wb of phthalic anhydride | | |
| resin weight of polyester A-2 | Wa = 213.0 | |
| resinous acid value based on phthalic anhydride | N = 38.0 | |
| 1 gram equivalent of phthalic anhydride | E = 74.1 | |
| reaction % of phthalic anhydride to be reacted with polyester A-2 | P = 60.0 | |

From the above,

Wb = 30.56 (0.206 mole)

Using the same procedures as stated in Example 1, 213.0 parts by weight of polyester A-2 and 30.56 parts by weight of phthalic anhydride were reacted to obtain varnish M, whose characteristics were as follows:

| non-volatile content | 65.3% |
| --- | --- |
| viscosity | V < W |
| resinous acid value | 40.5 |
| titration midpoint potential of phthalic anhydride under the state of developing resinous acid value | −290 mV |
| resinous acid value based on phthalic anhydride | 37.5 |

EXAMPLE 3

| Composition of polyester resin A-3 | | |
| --- | --- | --- |
| isophthalic acid | 129.14 parts | (0.777 mole) |
| adipic acid | 29.24 | (0.2) |
| trimethylolpropane | 25.05 | |
| neopentylglycol | 52.77 | |
| 1,6-hexanediol | 56.04 | |
| resin weight (Wa) | 250.6 parts | |
| resinous acid value | 2.0 | |
| Calculation of Wb of trimellitic anhydride | | |
| resin weight of polyester A-3 | Wa = 250.6 | |
| resinous acid value based on trimellitic anhydride | N = 6.0 | |
| 1 gram equivalent of trimellitic anhydride | E = 64.0 | |
| reaction % of trimellitic anhydride to be reacted with polyester A-3 | P = 40.0 | |

From the above,

Wb = 2.89 (0.015 mole)

Using the same procedures as stated in Example 1, 250.6 parts by weight of polyester A-3 and 2.89 parts by weight of trimellitic anhydride were reacted to obtain varnish N, whose characteristics were as follows:

| non-volatile content | 64.9% |
| --- | --- |
| viscosity | W |
| resinous acid value | 8.1 |
| titration midpoint potential of trimellitic anhydride under the state of developing resinous acid value | −230 mV |
| resinous acid value based on trimellitic anhydride | 5.9 |

EXAMPLE 4

| Composition of polyester resin A-4 | | |
| --- | --- | --- |
| isophthalic acid | 115.37 parts | (0.694 mole) |
| adipic acid | 29.24 | (0.2) |
| trimethylolpropane | 46.62 | |
| neopentylglycol | 41.78 | |
| 1,6-hexanediol | 44.38 | |
| resin weight (Wa) | 231.0 parts | |
| resinous acid value | 2.0 | |
| Calculation of Wb of trimellitic anhydride | | |
| resin weight of polyester A-4 | Wa = 231.0 | |
| resinous acid value based on trimellitic anhydride | N = 28.0 | |
| 1 gram equivalent of trimellitic anhydride | E = 64.0 | |
| reaction % of trimellitic anhydride to be reacted with polyester A-4 | P = 40.0 | |

From the above,

Wb = 12.99 (0.068 mole)

Using the same procedures as stated in Example 1, 231.0 parts by weight of polyester A-4 and 12.99 parts by weight of trimellitic anhydride were reacted to obtain varnish O, whose characteristics were as follows:

| non-volatile content | 65.1% |
| --- | --- |
| viscosity | Y |
| resinous acid value | 29.4 |

EXAMPLE 5

| Composition of polyester resin A-5 | | |
|---|---|---|
| isophthalic acid | 127.31 parts | (0.766 mole) |
| adipic acid | 29.24 | (0.2) |
| trimethylolpropane | 25.05 | |
| neopentylglycol | 52.77 | |
| 1,6-hexanediol | 56.04 | |
| resin weight (Wa) | 249.2 parts | |
| resinous acid value | 2.0 | |
| Calculation of Wb of pyromellic anhydride | | |
| resin weight of polyester A-5 | Wa = 249.2 | |
| resinous acid value based on pyromellic anhydride | N = 6.0 | |
| 1 gram equivalent of pyromellitic anhydride | E = 54.5 | |
| reaction % of pyromellitic anhydride to be reacted with polyester A-5 | P = 60.0 | |

From the above, $$Wb = 3.69 \ (0.017 \ \text{mole})$$

Using the same procedures as stated in Example 1, 249.2 parts by weight of polyester A-5 and 3.69 parts by weight of pyromellic anhydride were reacted to obtain varnish P, whose characteristics were as follows:

| | |
|---|---|
| non-volatile content | 64.6% |
| viscosity | X |
| resinous acid value | 8.6 |
| titration midpoint potential of pyromellitic anhydride under the state of developing resinous acid value | −180 mV |
| resinous acid value based on pyromellitic anhydride | 5.8 |

EXAMPLE 6

| Composition of polyester resin A-6 | | |
|---|---|---|
| isophthalic acid | 116.01 parts | (0.698 mole) |
| adipic acid | 29.24 | (0.2) |
| trimethylolpropane | 31.94 | |
| neopentylglycol | 46.71 | |
| 1,6-hexanediol | 49.60 | |
| resin weight (Wa) | 235.5 parts | |
| resinous acid value | 2.0 | |
| Calculation of Wb of pyromellitic anhydride | | |
| resin weight of polyester A-6 | Wa = 235.5 | |
| resinous acid value based on pyromellitic anhydride | N = 18.0 | |
| 1 gram equivalent of pyromellitic anhydride | E = 54.5 | |
| reaction % of pyromellitic anhydride to be reacted with polyester A-6 | P = 60.0 | |

From the above, $$Wb = 10.77 \ (0.049 \ \text{mole})$$

Using the same procedures as stated in Example 1, 235.5 parts by weight of polyester A-6 and 10.77 parts by weight of pyromellitic anhydride were reacted to obtain varnish Q, whose characteristics were as follows:

| | |
|---|---|
| non-volatile content | 64.9% |
| viscosity | Z |
| resinous acid value | 19.7 |
| titration midpoint potential of pyromellitic anhydride under the state of developing resinous acid value | −180 mV |
| resinous acid value based on pyromellitic anhydride | 17.6 |

EXAMPLE 7

| Composition of polyester resin A-7 | | |
|---|---|---|
| isophthalic acid | 127.31 parts | (0.766 mole) |
| adipic acid | 29.24 | (0.2) |
| trimethylolpropane | 25.05 | |
| neopentylglycol | 52.77 | |
| 1,6-hexanediol | 56.04 | |
| resin weight (Wa) | 249.2 parts | |
| resinous acid value | 2.0 | |
| Calculation of Wb of tetrachlorophthalic anhydride | | |
| resin weight of polyester A-7 | Wa = 249.2 | |
| resinous acid value based on tetrachlorophthalic anhydride | N = 6.0 | |
| 1 gram equivalent of tetrachlorophthalic anhydride | E = 143.0 | |
| reaction % of tetrachlorophthalic anhydride to be reacted with polyester A-7 | P = 60.0 | |

From the above, $$Wb = 9.91 \ (0.035 \ \text{mole})$$

Using the same procedures as stated in Example 1, 249.2 parts by weight of polyester A-7 and 9.91 parts by weight of tetrachlorophthalic anhydride were reacted to obtain varnish R, whose characteristics were as follows:

| | |
|---|---|
| non-volatile content | 65.2% |
| viscosity | V-W |
| resinous acid value | 8.0 |
| titration midpoint potential of tetrachlorophthalic anhydride under the state of developing resinous acid value | −120 mV |
| resinous acid value based on tetrachlorophthalic anhydride | 6.0 |

EXAMPLE 8

| Composition of alkyd resin A-8 | | |
|---|---|---|
| isophthalic acid | 141.8 parts | (0.853 mole) |
| adipic acid | 14.62 | |
| trimethylolethane | 78.56 | |
| neopentylglycol | 31.55 | |
| coconut oil | 88.58 | |
| dehydrated castor oil | 22.14 | |
| resin weight (Wa) | 340.1 parts | |
| resinous acid value | 2.0 | |
| Calculation of Wb of phthalic anhydride | | |
| resin weight of alkyd A-8 | Wa = 340.1 | |
| resinous acid value based on phthalic anhydride | N = 6.0 | |
| 1 gram equivalent of phthalic anhydride | E = 74.1 | |
| reaction % of phthalic anhydride | P = 60.0 | |

(continued on previous column: titration midpoint potential of trimellitic anhydride under the state of developing resinous acid value −230 mV; resinous acid value based on trimellitic anhydride 28.1)

-continued to be reacted with alkyd A-8

From the above,

Wb = 6.87 (0.046 mole)

Using the same procedures as stated in Example 1, 340.1 parts by weight of alkyd A-8 and 6.87 parts by weight of phthalic anhydride were reacted to obtain varnish S, whose characteristics were as follows:

| | |
|---|---|
| non-volatile content | 60.1% |
| viscosity | T–U |
| resinous acid value | 7.8 |
| titration midpoint potential of phthalic anhydride under the state of developing resinous acid value | −290 mV |
| resinous acid value based on phthalic anhydride | 5.7 |

EXAMPLE 9

| Composition of alkyd resin A-9 | | |
|---|---|---|
| isophthalic acid | 141.8 parts | (0.853 mole) |
| adipic acid | 14.62 | |
| trimethylolethane | 78.56 | |
| neopentylglycol | 31.55 | |
| coconut oil | 88.58 | |
| dehydrated castor oil | 22.14 | |
| resin weight (Wa) | 340.1 parts | |
| resinous acid value | 2.0 | |
| Calculation of Wb of pyromellitic anhydride | | |
| resin weight of alkyd A-9 | Wa = 340.1 | |
| resinous acid value based on pyromellitic anhydride | N = 6.0 | |
| 1 gram equivalent of pyromellitic anhydride | E = 54.5 | |
| reaction % of pyromellitic anhydride to be reacted with alkyd A-9 | P = 60.0 | |

From the above,

Wb = 5.03 (0.023 mole)

Using the same procedures as stated in Example 1, 340.1 parts by weight of alkyd A-9 and 5.03 parts by weight of pyaromellitic anhydride were reacted to obtain varnish T, whose characteristics were as follows:

| | |
|---|---|
| non-volatile content | 60.7% |
| viscosity | W–X |
| resinous acid value | 8.1 |
| titration midpoint potential of pyromellitic anhydride under the state of developing resinous acid value | −180 mV |
| resinous acid value based on pyromellitic anhydride | 6.1 |

COMPARATIVE EXAMPLE 1

Preparation of comparative varnish U

133 Parts by weight of isophthalic acid, 29.2 parts by weight of adipic acid, 25.1 parts by weight of trimethylolethane, 52.8 parts by weight of neopentyl glycol and 56 parts by weight of 1,6-hexanediol were placed in a reaction tank and heated. Stirring was commenced when the starting materials were melted to a stirrable condition and tank temperature was raised to 220° C. At this time, from 160° C. to 220° C., the temperature was raised gradually in 3 hours at a constant rate. The formed condensed water was continuously removed out of the system. When reached to 220° C., the same temperature was maintained for 1 hour, and thereafter, 5 parts of xylene were added gradually as a refluxing solvent and the reaction was changed to a condensation in the presence of solvent and kept going. At the time when the resinous acid value reached to 8.0, the reaction was stopped and the mixture was allowed to cool. After cooling, 118.2 parts of xylene and 13.7 parts of Cellosolve acetate were added to obtain a polyester resin varnish U, whose characteristics were as follows:

| | |
|---|---|
| non-volatile content | 65.2% |
| viscosity | V |
| resinous acid value | 8.0 |

COMPARATIVE EXAMPLE 2

Preparation of comparative resin varnish V 88.6 Parts of coconut oil, 22.1 parts of dehydrated castor oil, 39.9 parts of trimethylolethane and 0.1 part of lithium naphthenate were placed in a reaction tank and the mixture was heated to 240° C. Ester-exchange reaction was carried out at 240° C. and then 38.6 parts of trimethylolethane, 149.6 parts of isophthalic acid, 14.6 parts of adipic acid, 31.6 parts of neopentylglycol and 7 parts of xylene ere added and dehydration reaction was carried out at 220° to 230° C. until the resinous acid value reached to 8.0. After cooling, 202 parts of xylene and 23.3 parts of Cellosolve acetate were added to obtain an alkyd resin varnish V, non-volatile content 60.0%, viscosity U and resinous acid value 8.3.

COMPARATIVE EXAMPLE 3

Preparation of comparative resin varnish W

Into a reaction vessel fitted with reflux condenser, dropping funnel, thermometer and stirrer, were placed 80 parts of xylene, 20 parts of Cellosolve acetate, 35 parts of methylmethacrylate (MMA), 48 parts of ethyl acrylate (EA), 16 parts of 2-hydroxyethyl methacrylate (HEMA) and 1 part of methacrylic acid (MAA) and the mixture was heated to 110° C. While maintaining the said temperature, a mixed solution of 80 parts of xylene, 20 parts of Cellosolve acetate, 1 part of azobis isobutyronitrile and 0.25 part of lauryl mercaptane was dropwisely added in 3 hours at a constant speed, and thereafter, the mixture was maintained at the same temperature for 2 hours to complete the reaction. The characteristics of thus obtained acrylic resin varnish W are as follows: non-volatile content 50.0%, viscosity Y and resinous acid value 7.0.

EXAMPLE 10

Preparation of resinous composition of acrylic resin whose acid value based on tetrachlorophthalic anhydride is 7.0, by the reaction of (A) 100 parts (on solid basis) of acrylic resin varnish W obtained in Comparative Example 3, and (B) Wb parts of tetrachlorophthalic anhydride capable of showing a titration midpoint potential of −120 mV in non-aqueous potentiometric titration under the state of developing resinous acid value.

| Calculation of Wb of tetrachlorophthalic anhydride: | |
|---|---|
| resin weight of acrylic resin W | Wa = 100 |
| resinous acid value derived from tetrachlorophthalic anhydride | N = 7.0 |
| 1 gram equivalent of tetrachlorophthalic anhydride | E = 143.0 |
| reaction % of tetrachlorophthalic anhydride to be reacted with acrylic resin W | P = 50.0 |

From the aforesaid equation:

Wb = 3.70 (0.013 mole)

Into a reaction vessel, were placed 100 parts of acrylic resin varnish W and 3.7 parts of tetrachlorophthalic anhydride, and the mixture was heated to 140° C. The reaction mixture was maintained at 140° C. until the resinous acid value reached to 14.0 and then allowed to cool. Thus obtained acrylic resinous varnish X had non-volatile content of 51.6% and viscosity of Z. Resinous acid value based on tetrachlorophthalic anhydride was 7.0.

EXAMPLE 11

A pale bluish white colored paint composition was prepared by mixing 35.0 parts (solid) of polyester resin L obtained in Example 1, 15.0 parts (solid) of U-van 20 SE-60 (melamine resin manufactured by Mitsuitoatsu K.K., as crosslinking agent), 8.0 parts of xylene, 4.0 parts of Solvesso 100, 7.0 parts of n-butanol, 0.015 parts of Silicone KF-69 (manufactured by Shinetsu Kagaku K.K.), 45.0 parts of Titanium CR-95 (manufactured by Ishihara Sangyo K.K.) and 2.3 parts of Fastgen Blue-NK (manufactured by Dainippon Ink K.K.). To this, were added a dilution solvent comprising 20.0 parts of Solvesso 100, 50.0 parts of toluene, 10.0 parts of xylene and 20.0 parts of n-butanol to adjust the Ford cup #4 viscosity to 20 sec./25° C. Thus obtained coating composition was applied by spraying onto SPC-1 dull steel plate previously treated with zinc phosphate, and the plate was, after standing for a defined period of time, baked at 100° C. for 30 minutes. The film properties are shown in the following Table 2.

EXAMPLES 12, 13 AND 14

The similar coating compositions were prepared following the procedures of Example 11, but substituting equivalent amounts of polyester resin N, polyester resin P and polyester resin R obtained in Examples 3, 5 and 7, for the polyester resin L, respectively. These compositions were, after having adjusted the viscosity, applied on the similar dull steel plates and baked at 100° C. for 30 minutes. The coatings were evaluated as in Example 11 and the test results were shown in the following Table 2.

EXAMPLE 15

A coating composition was prepared by using the same procedures and prescription as given in Example 11. However, in this Example, polyester resin L was replaced by polyester resin R and 45.0 parts (solid) of the resin R and 5.0 parts (solid) of U-van 20 SE-60 were used, respectively. The composition was diluted to adjust the viscosity, applied to the similar dull steel plate and baked at 100° C. for 30 minutes. The coating was evaluated as in Example 11 and the test results were shown in Table 2.

EXAMPLE 16

Using polyester resin R and U-van 20 SE-60 in solid ratio of 30.0 parts and 20 parts, and repeating the same procedures of Example 11 with the same prescription, a coating composition was prepared, which was diluted with a mixed solvent to adjust the viscosity, applied on the similar dull steel plate and baked at 100° C. for 30 minutes as in Example 11. The coating was evaluated and the results were shown in Table 2.

EXAMPLES 17, 18 AND 19

Using polyester resin M, polyester resin O and polyester resin Q obtained in Examples 2, 4 and 6 in place of polyester resin L in Example 11 and following the procedures of Example 11 with the same prescription stated therein, three different coating compositions were prepared, which were then diluted with mixed solvent to adjust viscosity, applied on the similar dull steel plates and baked at 100° C. for 30 minutes, respectively. Evaluation of these coatings were carried out as in Example 11 and the results were shown in Table 2.

COMPARATIVE EXAMPLES 4 AND 5

A coating composition was prepared as in Example 11, but substituting equivalent amounts of polyester resin U prepared in Comparative Example 1 for the polyester resin L. After diluting with a mixed solvent and applying on the similar dull steel plates, the coatings were baked at 140° C. and at 100° C. for 30 minutes, respectively. The coatings were then evaluated in the same way as in Example 11 and test results were shown in Table 2.

COMPARATIVE EXAMPLE 6

To the coating composition of Comparative Example 4, was added as external catalyst, 1.0 part of p-toluenesulfonic acid and mixed well. This was, after adjusting viscosity, applied on the similar dull steel plate and baked at 100° C. for 30 minutes. The coating was evaluated in the same way as stated in Example 11 and the test results were shown in Table 2.

EXAMPLE 20

In Example 11, polyester resin L was replaced by alkyd resin S prepared in Example 8 and a coating composition was prepared, applied on the similar dull steel plate and baked at the same temperature. Thus obtained coating was evaluated in the same way and the results were shown in Table 2.

EXAMPLE 21

In Example 11, polyester resin L was replaced by alkyd resin T prepared in Example 9 and a coating composition was prepared, applied on the similar dull steel plate and baked at 100° C. for 30 minutes. Thus obtained coating was evaluated in the same way and the results were shown in Table 2.

COMPARATIVE EXAMPLE 7

In Example 11, polyester resin L was replaced by alkyd resin V prepared in Comparative Example 2 and a coating composition was prepared, applied on the similar dull steel plate and baked at 140° C. for 30 minutes. Thus obtained coating was evaluated in the same way and the results were shown in Table 2.

COMPARATIVE EXAMPLE 8

Using the same coating composition as stated in Comparative Example 7, the same procedures of Example 11 were repeated excepting carrying out the baking at 100° C. for 30 minutes. The test results are shown in Table 2.

EXAMPLE 22

In Example 11, polyester resin L was replaced by acrylic resin X prepared in Example 10 and a coating composition was prepared, applied on the similar dull steel plate and baked at 100° C. for 30 minutes. Thus obtained coating was evaluated in the same way and the results were shown in Table 2.

COMPARATIVE EXAMPLE 9

In Example 11, polyester resin L was replaced by acrylic resin W prepared in Comparative Example 3 and a coating composition was prepared, applied on the similar dull steel plate and baked at 100° C. at 30 minutes. Thus obtained coating was evaluated in the same way and the results were shown in Table 2.

EXAMPLE 23

A coating composition was prepared by mixing 30.0 parts (solid) of alkyd resin T obtained in Example 9, 20.0 parts (solid) of Super Beckamine G 1850 (urea resin, manfactured by Dainippon Ink K.K., crosslinking agent), 1.0 part of xylene, 4.0 parts of n-butanol, 0.2 part of Silicone TSA-720 (manufactured by Toshiba Silicone K.K.), 40.0 parts of Titanium CR-95 (manufactured by Ishihara Sangyo K.K.) and 2.0 parts of Fastgen Blue NK and diluting the same with a mixed solvent comprising 50.0 parts of methanol and 50.0 parts of xylene to adjust the Ford cup #4 viscosity ato 23 sec./20° C. Thus obtained composition was applied by spraying onto SPC-1 dull steel plate previously treated with zinc phosphate and after standing for a defined period of time, baked at 80° C. for 30 minutes. The coating was then evaluated and the test results were shown in Table 2.

COMPARATIVE EXAMPLE 10

In Example 23, alkyd resin T was replaced by alkyd resin V prepared in Comparative Example 2 and a coating composition was prepared as in Example 23. To this, were added as external catalyst 2.5 parts of p-toluene sulfonic acid and after adjusting the viscosity, thus obtained composition was applied on the similar steel plate and baked at the same temperature as in Example 23. Thus obtained coating was evaluated in the same way and the results were shown in Table 2.

EXAMPLE 24

In Example 11, the crosslinking agent was replaced by U-van 125 (melamine resin manufactured by Mitsui toatsu K.K.) and a similar coating composition was prepared using the same prescription. After diluting to adjust viscosity, said composition was applied on the similar steel plate and baked at 100° C. for 30 minutes. Thus obtained coating was evaluated as in Example 11 and the results were shown in Table 2.

EXAMPLE 25

A coating composition was prepared by mixing 50.0 parts (solid) of acrylic resin X used in Example 22, 10.0 parts of Cellosolve acetate, 26.0 parts of Solvesso 100, 70.0 parts of Titanium CR-95 (Ishihara Sangyo K.K.), 3.5 parts of Fastgen Blue NK, 0.8 part of Modaflow (manufactured by Monsanto) and 6.5 parts (solid) of Desmodule TPL-2291 (isocyanate crosslinking agent, manufactured by Sumitomo Bayer Co.). The composition was then diluted with a mixed solvent comprising 16.0 parts of butylacetate, 50.0 parts of xylene, 20.0 parts of Solvesso 100 and 6.0 parts of Cellosolve acetate to adjust Ford cup #4 viscosity to 20 seconds/25° C., and applied to SPC-1 dull steel plate previously treated with zinc phosphate by spraying. After standing for a defined period of time, the coating was baked at 80° C. for 30 minutes and the film properties were evaluated. The results are shown in Table 3.

COMPARATIVE EXAMPLE 11

In Example 25, acrylic resin x was replaced by alkyd resin W prepared in Comparative Example 9 and a coating composition was prepared, applied on the similar dull steel plate and baked at 80° C. for 30 minutes as in Example 25. Thus obtained coating was evaluated in the same way and the results were shown in Table 3.

COMPARATIVE EXAMPLE 12

The same coating composition as stated in Comparative Example 11 was added with 0.006 part of dibutyl tin dilaurateDBTDL) as an external catalyst and mixed well. Thus obtained composition was, after adjusting the viscosity, applied on similar dull steel plate and baked at 80° C. for 30 minutes. The coating was evaluated and the test results were shown in Table 3.

EXAMPLES 26 AND 27

In Example 11, polyester resin L was replaced by polyester resin P and by polyester resin R obtained in Example 5 and in Example 7 and U-van 20SE-60 was replaced by Cymel 303 (methyl melamine resin manufactured by Mitsui Toatsu K.K.), to obtain coating compositions. After applying onto the similar dull steel plates, they are baked at 120° C. for 30 minutes and the coatings were evaluated in the same way and the results were shown in Table 4.

COMPARATIVE EXAMPLE 13

In Example 11, polyester resin L was replaced by polyester resin U prepared in Comparative Example 1 and U-van 20SE-60 was replaced by Cymel 303 (methyl melamine resin manufactured by Mitsui Toatsu, crosslinking agent) to obtain a coating composition. This was, after adjusting the viscosity, applied on the similar dull steel plate and baked at 120° C. for 30 minutes. Thus obtained coating was evaluated in the same way and the results were shown in Table 4. Test methods and evaluation standards:

Note 2: Pencil hardness

The coating was scratched by Mitsubishi Uni pencil and pencil hardness was judged by maximum hardness causing no pencil scratches.

Note 3: Gel Fraction

Sample specimen of baked coating was subjected to a solvent extraction, by using Soxhlet-extractor, with acetone/methanol=1/1 (weight ratio) at 70° C. for 5 hours. The specimen was then dried at 120° C. for 30 minutes in decicator, allowed to cool and weighed the final weight. From the weight difference, gel fraction was calculated.

Note 4: Coat surface condition

Coating composition was applied on tinplate by flow coating, and pigment dispersion stability was evaluated by visual observation of finishing appearance, gloss and on the basis of the following criteria:

| | |
|---|---|
| ⊙ | very good |
| ○ | good |
| Δ | slightly inferior |
| X | no good |

Note 5: Water Resistance

Baked sample specimen was dipped in warmed water (40° C.) for 10 days and the coat surface condition was evaluated on the basis of the following criteria:

| | |
|---|---|
| ○ | no abnormality |
| Δ | partly blistered |
| X | blistered, gloss down |

Note 6: Storage Stability

Coating composition was kept at 40° C. and storage stability was evaluated by maximum duration up to gelation.

TABLE 2

| Example Number | Example 11 | Example 12 | Example 13 | Example 14 | Example 15 | Example 16 | Example 17 | Example 18 | Example 19 | Comp. Example 4 | Comp. Example 5 |
|---|---|---|---|---|---|---|---|---|---|---|---|
| Formulation Note 1 | | | | | | | | | | | |
| polyester resin | L 35.0 | N 35.0 | P 35.0 | R 35.0 | R 45.0 | R 30.0 | M 35.0 | O 35.0 | Q 35.0 | U 35.0 | U 35.0 |
| alkyd resin | — | — | — | — | — | — | — | — | — | — | — |
| acrylic resin | — | — | — | — | — | — | — | — | — | — | — |
| melamine resin U20SE | 15.0 | 15.0 | 15.0 | 15.0 | 5.0 | 20.0 | 15.0 | 15.0 | 15.0 | 15.0 | 15.0 |
| melamine resin U125 | — | — | — | — | — | — | — | — | — | — | — |
| urea resin G-1850 | — | — | — | — | — | — | — | — | — | — | — |
| xylene | 8.0 | 8.0 | 8.0 | 8.0 | 8.0 | 8.0 | 8.0 | 8.0 | 8.0 | 8.0 | 8.0 |
| Solvesso 100 | 4.0 | 4.0 | 4.0 | 4.0 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 | 7.0 | 7.0 | 7.0 | 7.0 |
| Titanium CR-95 | 45.0 | 45.0 | 45.0 | 45.0 | 45.0 | 45.0 | 45.0 | 45.0 | 45.0 | 45.0 | 45.0 |
| Fastgen blue NK | 2.3 | 2.3 | 2.3 | 2.3 | 2.3 | 2.3 | 2.3 | 2.3 | 2.3 | 2.3 | 2.3 |
| Silicone KF-69 | 0.015 | 0.015 | 0.015 | 0.015 | 0.015 | 0.015 | 0.015 | 0.015 | 0.015 | 0.015 | 0.015 |
| Silicone TSA-720 | — | — | — | — | — | — | — | — | — | — | — |
| ext. catalyst P-TSA | — | — | — | — | — | — | — | — | — | — | — |
| Baking condition °C · 30' | 100 | 100 | 100 | 100 | 100 | 100 | 100 | 100 | 100 | 140 | 100 |
| Film properties | | | | | | | | | | | |
| pencil hardness Note 2 | F | F-H | H | F | F-H | H-2H | H | H | 2H | H | 3B |
| gel fraction Note 3 | 85 | 88 | 92 | 95 | 86 | 92 | 92 | 94 | 96 | 94 | 56 |
| surface cond. Note 4 | ⊚ | ⊚ | ⊚ | ⊚ | ⊚ | ⊚ | ⊚ | ⊚ | ⊚ | ⊚ | △ |
| water resist. Note 5 | ○ | ○ | ○ | ○ | ○ | ○ | ○ | ○ | ○ | ○ | × |
| Paint properties | | | | | | | | | | | |
| storage stab. Note 6 | more than 3 months OK | more than 3 months OK | more than 3 months OK | more than 3 months OK | more than 3 months OK | more than 3 months OK | 20 days gelation | 2 months gelation | 2 months gelation | more than 3 months OK | more than 3 months OK |

| Example Number | Comp. Example 6 | Example 20 | Example 21 | Comp. Example 7 | Comp. Example 8 | Example 22 | Comp. Example 9 | Example 23 | Comp. Example 10 | Example 24 |
|---|---|---|---|---|---|---|---|---|---|---|
| Formulation Note 1 | | | | | | | | | | |
| polyester resin | U 35.0 | S 35.0 | T 35.0 | V 35.0 | V 35.0 | X 35.0 | W 35.0 | T 30.0 | V 30.0 | L 35.0 |
| alkyd resin | — | — | — | — | — | — | — | — | — | — |
| acrylic resin | — | — | — | — | — | — | — | — | — | — |
| melamine resin U20SE | 15.0 | 15.0 | 15.0 | 15.0 | 15.0 | 15.0 | 15.0 | — | — | 15.0 |
| melamine resin U125 | — | — | — | — | — | — | — | 20.0 | 20.0 | — |
| urea resin G-1850 | — | — | — | — | — | — | — | 1.0 | 1.0 | — |
| xylene | 8.0 | 8.0 | 8.0 | 8.0 | 8.0 | 8.0 | 8.0 | — | — | 8.0 |
| Solvesso 100 | 4.0 | 4.0 | 4.0 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 | — | — | 7.0 |
| Titanium CR-95 | 45.0 | 45.0 | 45.0 | 45.0 | 45.0 | 45.0 | 45.0 | 40.0 | 40.0 | 45.0 |
| Fastgen blue NK | 2.3 | 2.3 | 2.3 | 2.3 | 2.3 | 2.3 | 2.3 | 2.0 | 2.0 | 2.3 |
| Silicone KF-69 | 0.015 | 0.015 | 0.015 | 0.015 | 0.015 | 0.015 | 0.015 | — | — | 0.015 |
| Silicone TSA-720 | — | — | — | — | — | — | — | 0.2 | 0.2 | — |
| ext. catalyst P-TSA | 1.0 | — | — | — | — | — | — | — | 2.5 | — |
| Baking condition °C · 30' | 100 | 100 | 100 | 100 | 100 | 100 | 100 | 80 | 80 | 100 |
| Film properties | | | | | | | | | | |
| pencil hardness Note 2 | H | HB-F | H | F | 4B | 2H | 2B | HB | HB | H |
| gel fraction Note 3 | 91 | 87 | 93 | 90 | 42 | 96 | 63 | 79 | 76 | 92 |
| surface cond. Note 4 | × | ⊚ | ⊚ | ⊚ | × | ⊚ | △ | ○ | × | ⊚ |
| water resist. Note 5 | × | ○ | ○ | ○ | × | ○ | × | △ | × | ○ |
| Paint properties | | | | | | | | | | |
| storage stab. Note 6 | 20 days gelation | more than 3 months OK | more than 3 months OK | more than 3 months OK | more than 3 months OK | more than 3 months OK | more than 3 months OK | 2 months gelation | 7 days gelation | more than 3 months OK |

Note 1: resinous weight is by solid weight

TABLE 3

| Example Number | Example 25 | Comp. Example 11 | Comp. Example 12 |
|---|---|---|---|
| Formulation Note 1 | | | |
| acrylic resin | X 50.0 | W 50.0 | W 50.0 |
| isocyanate crosslink. (Desmodule TPL-2291) | 13.0 | 13.0 | 13.0 |
| Cellosolve acetate | 10.0 | 10.0 | 10.0 |
| Solvesso 100 | 26.0 | 26.0 | 26.0 |
| Titanium CR-95 | 70.0 | 70.0 | 70.0 |
| Fastgen blue NK | 3.5 | 3.5 | 3.5 |
| Modaflow | 0.8 | 0.8 | 0.8 |
| ext. catalyst DBTDL | — | — | 0.006 |
| Baking condition °C. × 30' | 80 | 80 | 80 |
| Film properties | | | |
| pencil hardness Note 2 | H | 3B | H |
| gel fraction Note 3 | 92 | 65 | 90 |
| surface cond. Note 4 | ⊚ | X | ○ |
| water resist. Note 5 | ○ | X | ○ |
| Paint properties | | | |
| pot-life (hrs) | 5 | 20 | 0.5 |

Note 1 resinous weight is by solid weight

TABLE 4

| Example Number | Example 26 | Example 27 | Comp. Example 13 |
|---|---|---|---|
| Formulation Note 1 | | | |
| polyester resin | P 35.0 | R 35.0 | U 35.0 |
| melamine resin Cymel 303 | 15.0 | 15.0 | 15.0 |
| xylene | 8.0 | 8.0 | 8.0 |
| Solvesso 100 | 4.0 | 4.0 | 4.0 |
| n-butanol | 7.0 | 7.0 | 7.0 |
| Titanium CR-95 | 45.0 | 45.0 | 45.0 |
| Fastgen blue NK | 2.3 | 2.3 | 2.3 |
| Silicone KF-69 | 0.015 | 0.015 | 0.015 |
| Baking condition °C. × 30' | 120 | 120 | 120 |
| Film properties | | | |
| pencil hardness Note 2 | F-H | F-H | 6B |
| gel fraction Note 3 | 82 | 90 | 39 |
| surface cond. Note 4 | ⊚ | ⊚ | X |
| water resist. Note 5 | ○ | ○ | ○ |
| Paint properties | | | |
| storage stability | more than 3 months OK | more than 3 months OK | more than 3 months OK |

Note 1 resinous weight is by solid weight

What is claimed is:

1. A resinous composition for coating use comprising a resin having a resinous acid value derived from polycarboxylic acid whose titration midpoint potential in non-aqueous potentiometric titration is more than −300 mV under the state capable of developing resinous acid value, of 2 to 50 and having a functional group reactive with crosslinking agent.

2. A method for the preparation of resinous composition for coating use comprising a resin having a resinous acid value derived from polycarboxylic acid whose titration midpoint potential in non-aqueous potentiometric titration is more than −300 mV under the state capable of developing resinous acid value of 2 to 50 and having a functional group reactive with a crosslinking agent characterizing by effecting an esterification of (A) Wa parts by weight (solid) of the resin having a functional group reactive with carboxyl group and a functional group reactive with a crosslinking agent, with (B) Wb parts by weight of polycarboxylic acid having a titration midpoint potential in non-aqueous potentiometric titration of more than −300 mV under the state capable of developing resinous acid value, Wb being calculated from the following:

$$Wb = \frac{N \cdot Wa}{\frac{56100}{E}\left(1 - \frac{P}{100}\right) - N}$$

wherein E represents 1 gram equivalent of said polycarboxylic acid (B); P is the reaction % of said polycarboxylic acid (B) to be reacted with the resin (A); N is resinous acid value based on said polycarboxylic acid (B) in the final resin and is determined in a range of 2 to 50, to a resinous acid value of N+M in which M is the resinous acid value originally possessed by the resin (A) and is 0 or any positive number.

3. A coating composition comprising at least one resin having a resinous acid value derived from polycarboxylic acid whose titration midpoint potential in non-aqueous potentiometric titration is more than −300 mV under the state capable of developing resinous acid value of 2 to 50 and having a functional group reactive with a crosslinking agent and at least one crosslinking agent, in a weight ratio in terms of solid of 95/5 to 45/55.

4. A composition according to claim 3 wherein the crosslinking agent is aminoplast or isocyanate compound.

* * * * *